United States Patent
Tofighbakhsh et al.

(10) Patent No.: US 11,026,095 B2
(45) Date of Patent: Jun. 1, 2021

(54) REAL-TIME NETWORK PROVISIONING FOR DISTRIBUTED VIRTUAL ZONES OF COLLABORATIVE MOBILE DEVICES FOR 5G OR OTHER NEXT GENERATION NETWORK

(71) Applicant: AT&T Intellectual Property I, L.P., Atlanta, GA (US)

(72) Inventors: Mostafa Tofighbakhsh, Cupertino, CA (US); Deva-Datta Sharma, San Ramon, CA (US); Shraboni Jana, Danville, CA (US); Bogdan Ungureanu, Holmdel, NJ (US); Rittwik Jana, Montville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/527,789

(22) Filed: Jul. 31, 2019

(65) Prior Publication Data
US 2021/0037390 A1    Feb. 4, 2021

(51) Int. Cl.
*H04W 4/00* (2018.01)
*H04W 16/10* (2009.01)
(Continued)

(52) U.S. Cl.
CPC ........... *H04W 16/10* (2013.01); *H04L 5/0032* (2013.01); *H04W 16/18* (2013.01); *H04W 48/16* (2013.01); *H04W 48/18* (2013.01)

(58) Field of Classification Search
CPC ..... H04W 16/10; H04W 48/16; H04W 48/18; H04W 16/18; H04L 5/0032
(Continued)

(56) References Cited

U.S. PATENT DOCUMENTS

| 6,067,457 A | 5/2000 | Erickson et al. |
| 6,192,232 B1 | 2/2001 | Iseyama |

(Continued)

FOREIGN PATENT DOCUMENTS

| CN | 102984758 | 3/2013 |
| EP | 1398975 | * 9/2002 |

(Continued)

OTHER PUBLICATIONS

Non-Final Office Action received for U.S. Appl. No. 16/367,648 dated May 27, 2020, 32 pages.
(Continued)

*Primary Examiner* — Chuong T Ho
(74) *Attorney, Agent, or Firm* — Amin, Turocy & Watson, LLP

(57) ABSTRACT

A radio access network intelligent controller (RIC) platform can enable various highly secure, reliable, fast communications for first responders during emergency situations. The RIC can utilize radio access network (RAN) resources, for example, beam management procedures to facilitate the use of virtual zones. The virtual zones can be generated dynamically by leveraging collaborating mobile devices from various zones. The virtual zones can be distributed entities that span across real-physical zones but are managed as a single logical entity under a common set of policies. The creation and management of virtual zones can be performed by a group of corresponding RICs as a distributed system.

20 Claims, 10 Drawing Sheets

(51) Int. Cl.
*H04W 16/18* (2009.01)
*H04L 5/00* (2006.01)
*H04W 48/16* (2009.01)
*H04W 48/18* (2009.01)

(58) Field of Classification Search
USPC .................................................. 370/329, 330
See application file for complete search history.

(56) References Cited

U.S. PATENT DOCUMENTS

| | | |
|---|---|---|
| 7,236,791 B2 | 6/2007 | Chambers et al. |
| 7,369,559 B2 | 5/2008 | Garakani et al. |
| 7,747,269 B2 | 6/2010 | Brewer et al. |
| 7,839,882 B2 | 11/2010 | Soliman |
| RE42,242 E | 3/2011 | Struhsaker |
| 7,937,068 B2 | 5/2011 | Hogberg et al. |
| 8,457,591 B2 | 6/2013 | Lambert et al. |
| 9,307,383 B1 | 4/2016 | Patrick |
| 9,420,446 B2 | 8/2016 | Brown et al. |
| 9,460,417 B2 * | 10/2016 | Strassner ............... G06Q 10/06 |
| 9,526,049 B2 | 12/2016 | Yuk et al. |
| 9,763,252 B2 | 9/2017 | Kilpatrick et al. |
| 9,826,557 B2 | 11/2017 | Smith |
| 10,028,129 B2 | 7/2018 | Ly et al. |
| 10,034,122 B2 | 7/2018 | Neves et al. |
| 10,057,774 B2 | 8/2018 | Salkini et al. |
| 10,085,235 B2 | 9/2018 | Buono et al. |
| 10,149,193 B2 | 12/2018 | Cui et al. |
| 10,497,129 B1 | 12/2019 | Cui et al. |
| 2010/0135205 A1 | 6/2010 | Li et al. |
| 2010/0182395 A1 * | 7/2010 | Delhoyo .................. H04N 7/15 348/14.08 |
| 2011/0090888 A1 | 4/2011 | Arms et al. |
| 2011/0092248 A1 | 4/2011 | Evanitsky |
| 2012/0099490 A1 | 4/2012 | Kummetz et al. |
| 2012/0208488 A1 | 8/2012 | Park et al. |
| 2013/0260732 A1 | 10/2013 | Singh |
| 2013/0288645 A1 | 10/2013 | Zheng |
| 2014/0068700 A1 | 3/2014 | Reilly et al. |
| 2014/0279808 A1 * | 9/2014 | Strassner ............... G06Q 10/10 706/47 |
| 2015/0169768 A1 | 6/2015 | Xu et al. |
| 2015/0358797 A1 | 12/2015 | Du |
| 2015/0373602 A1 | 12/2015 | Hampel et al. |
| 2016/0135242 A1 | 5/2016 | Hampel et al. |
| 2017/0019853 A1 | 1/2017 | Ghosh et al. |
| 2017/0086049 A1 | 3/2017 | Vrzic |
| 2017/0086119 A1 | 3/2017 | Xu et al. |
| 2017/0108236 A1 | 4/2017 | Guan et al. |
| 2017/0111228 A1 | 4/2017 | Obaidi et al. |
| 2017/0134961 A1 | 5/2017 | Ghosh et al. |
| 2017/0142757 A1 | 5/2017 | Mckibben et al. |
| 2017/0359237 A1 | 5/2017 | Ghosh et al. |
| 2017/0230809 A1 | 8/2017 | Dm et al. |
| 2017/0302355 A1 | 10/2017 | Islam et al. |
| 2017/0331577 A1 | 11/2017 | Parkvall et al. |
| 2017/0347391 A1 | 11/2017 | Tenny et al. |
| 2017/0359106 A1 | 12/2017 | Wilson et al. |
| 2018/0068246 A1 * | 3/2018 | Crivat ............... G06Q 10/06313 |
| 2018/0069606 A1 | 3/2018 | Jung et al. |
| 2018/0077615 A1 | 3/2018 | El-najjar et al. |
| 2018/0152869 A1 | 5/2018 | Cedergren et al. |
| 2018/0188747 A1 | 7/2018 | Venturelli |
| 2018/0220340 A1 | 8/2018 | Ramachandra et al. |
| 2018/0227805 A1 | 8/2018 | Jang et al. |
| 2018/0255496 A1 | 9/2018 | Kim |
| 2018/0279213 A1 | 9/2018 | Raghavan et al. |
| 2018/0279221 A1 | 9/2018 | Fuleshwar et al. |
| 2018/0302834 A1 | 10/2018 | Zhang et al. |
| 2018/0338321 A1 | 11/2018 | Shepard et al. |
| 2018/0343567 A1 | 11/2018 | Ashrafi |
| 2018/0359654 A1 | 12/2018 | Mcdonald et al. |
| 2019/0004831 A1 | 1/2019 | Sun |
| 2019/0007879 A1 | 1/2019 | Baek et al. |
| 2019/0045414 A1 | 2/2019 | Guerreiro et al. |
| 2019/0095687 A1 | 3/2019 | Shaw et al. |
| 2019/0150219 A1 | 5/2019 | Wang et al. |
| 2019/0223065 A1 | 7/2019 | Lu et al. |
| 2020/0007409 A1 * | 1/2020 | Kim ..................... H04L 43/062 |
| 2020/0162956 A1 | 5/2020 | Cui et al. |
| 2020/0213917 A1 | 7/2020 | Liu |
| 2020/0221319 A1 | 7/2020 | Kang et al. |
| 2020/0252807 A1 | 8/2020 | Han et al. |

FOREIGN PATENT DOCUMENTS

| | | | |
|---|---|---|---|
| EP | 1398975 A1 * | 3/2004 | ............... H04Q 3/00 |
| WO | 2010121645 A1 | 10/2010 | |
| WO | 2014069982 A1 | 5/2014 | |
| WO | 2014078917 A1 | 5/2014 | |
| WO | 2017133535 A1 | 8/2017 | |
| WO | 2018026923 A1 | 2/2018 | |
| WO | 2018063436 A1 | 4/2018 | |
| WO | 2018070715 A1 | 4/2018 | |
| WO | 2018088812 A1 | 5/2018 | |
| WO | 2018093948 A1 | 5/2018 | |
| WO | 2018125686 A2 | 7/2018 | |
| WO | 2018134483 A1 | 7/2018 | |
| WO | 2018141945 A1 | 8/2018 | |
| WO | 2018155965 A1 | 8/2018 | |
| WO | 2018175891 A1 | 9/2018 | |
| WO | 2018176385 A1 | 10/2018 | |
| WO | 2019007486 A1 | 1/2019 | |

OTHER PUBLICATIONS

Non-Final Office Action received for U.S. Appl. No. 16/367,697 dated Apr. 20, 2020, 31 pages.

Non-Final Office Action received for U.S. Appl. No. 16/367,573 dated May 14, 2020, 35 pages.

Kruger, Lennard G. "The First Responder Network (FirstNet) and Next-Generation Communications for Public Safety: Issues for Congress" Congressional Research Service, 2017. 30 pages. https://psbc.vermont.gov/sites/vern/files/documents/Congressional%20Rept%20FirstNet%20Jan%202017.pdf.

Braunstein, Brian et al. "Feasibility of Using Distributed Wireless Mesh Networks for Medical Emergency Response." AMIA annual symposium proceedings, American Medical Informatics Association, pp. 86-90, 2006. 5 pages. https://www.ncbi.nlm.nih.gov/pmc/articles/PMC1839719/.

King, Kevin "Verizon unveils public safety private corecore," Verizon, verizon.com,Mar. 30, 2018. 2 pages. https://web.archive.org/web/20180330134117/https://www.verizon.com/about/news/verizon-unveils-public-safety-private-core.

Ramos, Edgar, et al. ,"Effects of Beamforming and Antenna Configurations on Mobility in 5G NR" , Ericsson Research, DOI: 10.13140/RG.2.2.22822.98887, Apr. 2018, 6 pages.

Ekman.,"Machine Learning for Beam Based Mobility Optimization in NR", Master of Science Thesis in Communication Systems Department of Electrical Engineering, Linköping University, 2017. 85 pages.

Guidolin. "Efficient Spectrum Management as an Enabler Towards 5G Cellular Systems." (2015). 155 pages. http://paduaresearch.cab.unipd.it/7621/1/Guidolin_Francesco_thesis_pdf.

Wireless Big Data of Smart 5G. Wireless World Research Forum, wwrf.ch, White Paper2, Outlook 20, Nov. 2017. 44 pages. https://www.wwrf.ch/files/wwrf/content/files/publications/outlook/White%20Paper%202-%20Wireless%20Big%20Data%20of%20Smart%205G.pdf.

Notice of Allowance received for U.S. Appl. No. 16/367,648 dated Sep. 14, 2020, 29 pages.

Final Office Action received for U.S. Appl. No. 16/367,697 dated Aug. 10, 2020, 43 pages.

Final Office Action received for U.S. Appl. No. 16/367,573 dated Oct. 14, 2020, 27 pages.

(56) References Cited

OTHER PUBLICATIONS

Final Office Action received for U.S. Appl. No. 16/367,573 dated Feb. 2, 2021, 27 pages.

* cited by examiner

REAL-TIME NETWORK PROVISIONING FOR DISTRIBUTED VIRTUAL ZONES OF COLLABORATIVE MOBILE DEVICES FOR 5G OR OTHER NEXT GENERATION NETWORK

TECHNICAL FIELD

This disclosure relates generally to facilitating beams for emergency situations. For example, this disclosure relates to facilitating predictive and proactive beam management for a 5G, or other next generation network, air interface.

BACKGROUND

5th generation (5G) wireless systems represent a next major phase of mobile telecommunications standards beyond the current telecommunications standards of 4th generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating predictive and proactive beam management is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
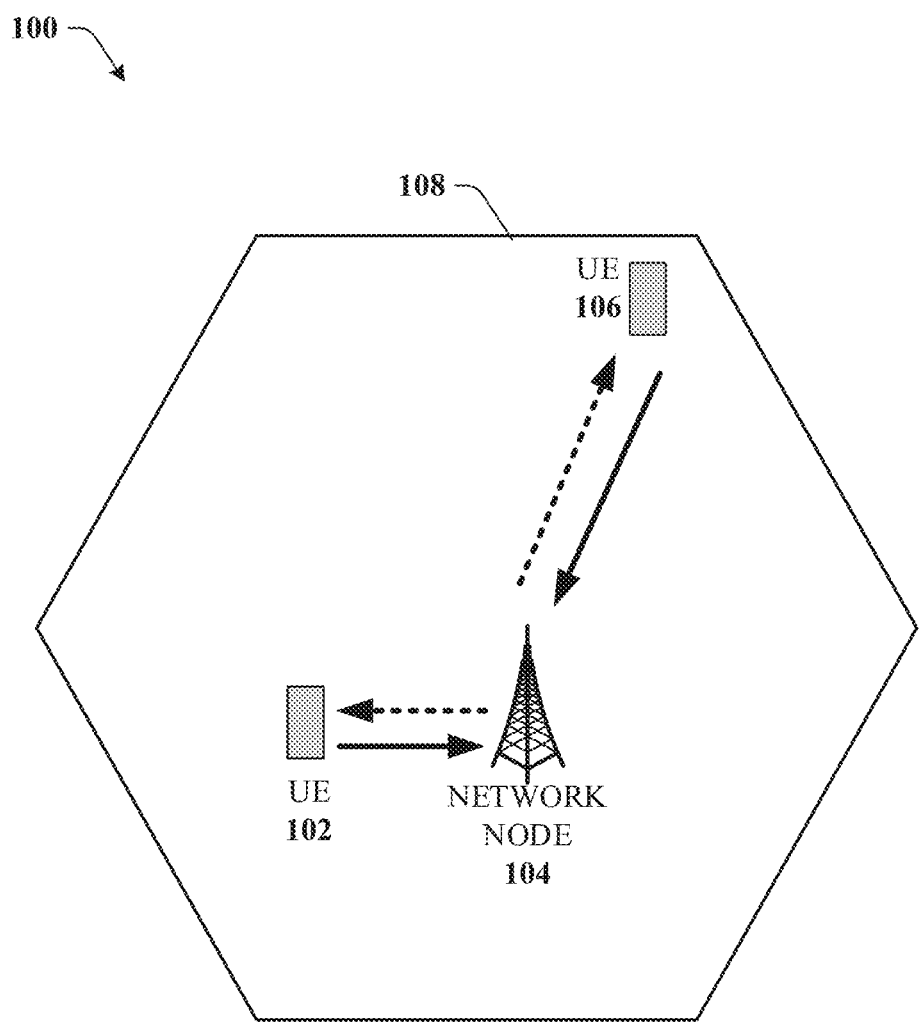
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate predictive and proactive beam management for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.xx technology. Additionally, substantially all aspects disclosed herein can be exploited in legacy telecommunication technologies.

Described herein are systems, methods, articles of manufacture, and other embodiments or implementations that can facilitate predictive and proactive beam management for a 5G network. Facilitating predictive and proactive beam management for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In 5G and beyond, resources can be employed as needed to deliver highly secure, reliable, fast communications for first responders during emergency situations. A radio access network intelligent controller (RIC) platform can enable various emergency services for first responders. Self-organizing service chaining of public safety edge applications, can be enabled in both time and space when triggered by an emergency situation. The RIC platform can perform reassignment of resources and network slices according to deep analytics and situational analysis.

The RIC platform can select and provide the best frequencies and resources to ensure that first responders have communication services that do not get affected by anomalies such as network load, congestion, and/or related degradations. Thus, dynamic bandwidth assignments can assist first responders with on-demand assigned beams that follow each responder during emergency services. The RIC can provide first responders with emergency communication services on-demand at a low cost based on commodity hardware. Thus, communication services supporting remote medical treatment during ambulance in-route to hospitals and emergency medical facilities can be supported by 5G. The system can provide a priority for emergencies over all other wireless traffic types. For example, with prioritization, entertainment can be the lowest, and business transactions as highest priority below first responders' communications. A database in the RIC can comprise data on first responders, their responsibilities for a given location. Additionally, specific non-essential services in a centralized unit (CU) and/or distributed unit (DU) can be shut down as inappropriate if resources are needed for the emergency. Various first responders for a particular situation can be organized in a special emergency team, or groups (firefighters, ambulance, EMTs, police, etc.). 3-dimensional beamforming can be used for vertical coverage in the case of high buildings, or drones flying, etc.

Emergency applications can also be network aware and vice versa. In addition, the RIC can capture the usage and quality of experience (QoE) models for each emergency to be used as training models to improve future beam patters and resource scheduling mechanisms. This disclosure provides for a multi-layer closed feedback loop for enhanced emergency communication services. The system can receive direction from 911 and emergency response systems, as other systems make calls into the RIC's protected APIs. When needed, the RIC can use its emerging and advanced features, such as radio access network (RAN) and core slicing, dynamic service chaining, service mesh functions, and programmable beam patterns. It can dynamically tag for the highest priority and treat beams and the RAN resources delivering communication services for the first responders involved in the emergency situation in progress.

When active during a situation, the emergency applications on the first responders' UEs can communicate with the RIC through secured application program interfaces (APIs). The RIC can then authenticate the APIs and the source and generate the required workloads accordingly. An emergency API on UE can provide a first responder customer identification that can entitle that UE to receive enhanced services and special beam support.

Beam selection and software-defined emergency operational controls can be utilized to split the resources for emergencies in dynamic ways. The triggers from 911 and first responders can enable the RIC to be application aware. Emergency applications on the first responder's devices can use the APIs to trigger additional services and resources. For example, the application running on a fireman's device can trigger connected network emergency drones to take off and fly to the scene to capture video from different angels. The RIC can automatically provide the beams to the drone to support the video streaming transmissions as it captures the video of the situation.

The RIC can provide control over network capacity, network resources, beam pattern control functions, and workload assignment for each emergency triggered by 911 or emergency response systems. For example, a 911 call can be received on behalf of devices in need of additional or specialized emergency service, plus location data, and information on the assigned responders that may be dealing with the situation. The information can be compiled into the RIC, which can execute reconfiguration of beam patterns and radio resources, if needed, to make sure they meet the current demand for all the first responders addressing the situation. The network resources assigned to support the emergency can be tagged with a special code and managed until not needed anymore and then released.

The applications on the emergency device and the first responders' UEs, or their proxies, can establish a control signal with the RIC for the duration of the emergency by calling the RIC's specifically designed APIs. The RIC can continually service each API and communicate handoffs and signal passing to neighboring RICs as needed. The RIC can also monitor the performance and service level agreement (SLA) measurements and track it as historical data for analysis and as training data sets for future improvements via machine learning ML.

When the emergency situation is over, the applications on the emergency devices and the first responders' UEs, or their proxies, can notify the RIC, via specialized API calls. The RIC can then release the resources from the requirement to support the emergency communications and it can restore the normal conditions for optimal services to all customers. The usage records collected for the special resources and services used for the emergency communications can be submitted to a back-up sync share or a base station subsystem for the appropriate processing, for billing, and other purposes.

This disclosure provides methods and procedures for RAN Beam Management for virtual zones. The virtual zones are defined dynamically by including collaborating UE's from any zone. The virtual zones are distributed entities and can span across many real-physical zones but are managed as a single logical entity under a common set of policies. The creation and management of virtual zones can be performed by a group of corresponding RICs as a distributed system.

A RAN architecture can treats each UE as a single entity from the perspective of beam management, QoS, and operational efficiencies. There are numerous use cases where a group of UEs can collaborate or participate in some activity towards a common goal. Some of the examples of such uses cases are as follows. In an emergency response scenario, FirstNet first responder need a reliable and high priority network connection with each other and with their command center. In dealing with a massive natural disaster, such as the forest fires or hurricanes, the support team can comprise first responders, local law enforcement (police), state government, local FEMA office, federal FEMA office, other first responder teams on standby, voluntary humanitarian organizations (e.g., Red Cross), etc. In another scenario, national high-profile events such as a presidential visit can require close on-going coordination between the secret service, local law enforcement, motorcade, and communication back with leadership in nations capital. International high-profile events can leverage multiple virtual zones: one for the event participants, and one for each national leader and his/her team. Alternatively, with the growing user base and market of multiplayer games in mobile computing, each game session can benefit from defining players as part of a virtual zone. Participants in a video conference call can engage other participants from around the world, and some even mobile. Each video session can benefit from defining every participant as part of a virtual zone. This use case offers enhanced revenue opportunities.

To facilitate the aforementioned scenarios, service profile models can be utilized, wherein the service profile models can be predefined service profile models stored in an OSS (e.g., open network automation platform (ONAP)). These models can be used to determine policies and configuration parameters to balance the service level agreement (SLA) needs of a service with optimal operational efficiencies. Examples of service include, but are not limited to: emergency responses, presidential visits, video conferences, mobile gaming, augmented reality/virtual reality, etc. Service profile models can be pre-defined based on engineering design of the service. Service profile models can also be generated via machine learning analysis of UEs and/or network performance (e.g., key performance indicators (KPI)s). Attributes/parameters of the service profile models can be computed based on real-time performance measurements from the network and/or the state of network.

In one embodiment, a UE can initiate a request for a specific service. The request can be communicated to the RIC via the RAN infrastructure components (e.g., DU/CU/gNB). The UE can also request that certain other UE's be included as part of the service. It should be noted that the UE can be anywhere on the RAN network, the UE can be on the RAN network of another service provider, and/or the UE can be accessible on Wi-Fi or other types of wireless networks. Once the UE request is received, it can be processed by its host RIC. The RIC can request and receive an appropriate service profile model from the OSS (e.g., ONAP). Consequently, the RIC can compute, in real-time, necessary performance and configuration parameters to provision the request service. The RIC can create a virtual/logical zone, instantiate a service profile model, and assign it a unique global ID (for use in distributed computing/control). The RIC can also provision the service by dispatching beam control and other configuration parameters to the RAN infrastructure. If the UE requested to include other UEs as part of the service, and those UEs are under the control of other RIC's, then a "distributed computing/control" process can be setup between the relevant RIC's.

Other UE's can independently make a request to join the same service instance (e.g., in case of a forest fire, first responders may have already setup the service. Federal FEMA may wish to join at a later stage) through their host RIC. Their RIC can communicate with the OSS/ONAP to discover service instance global IDs and relevant RIC's. These other UE's can now be included as members of the original service instance. During operation, the UE's in the virtual zone and their RIC's can form a "distributed system" (e.g., distributed computing/control), which can coordinate the execution of relevant configuration and performance policies. Thus, the distributed system formed is a dynamic distributed system in many ways. For instance, new UE's and RIC's can join or leave the system as the situation evolves, new policies can be interjected depending upon the situation evolution, and/or the mobility of UE's in the system (e.g., as UEs move around they can leave the coverage of one RIC and move to another RIC's coverage).

It should also be noted that an artificial intelligence (AI) component can facilitate automating one or more features in accordance with the disclosed aspects. A memory and a processor as well as other components can include functionality with regard to the figures. The disclosed aspects in connection with beams predictive and proactive beam management can employ various AI-based schemes for carrying out various aspects thereof. For example, a process for detecting one or more trigger events, modifying a resource allocation as a result of the one or more trigger events, and modifying one or more beam strengths, virtual zones, and so forth, can be facilitated with an example automatic classifier system and process. In another example, a process for penalizing one beam while preferring another beam can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be a signal strength and a technology and the classes can be an output power reduction value. In another example, the attributes can be a signal strength, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to allocating network resources, modifying a priority for beam selection, virtual zones, and so forth. The criteria can include, but is not limited to, predefined values, frequency attenuation tables or other parameters, service provider preferences and/or policies, and so on.

In one embodiment, described herein is a method comprising facilitating, by a wireless network device comprising a processor, receiving, from a mobile device, a request for a resource. Based on the request for the resource, the method can comprise requesting, by the wireless network device from a data store, model data representative of a service profile model applicable to the resource. Additionally, in response to the requesting the service profile model, the method can comprise facilitating, by the wireless network device, receiving the model data representative of the service profile model applicable to the resource. Furthermore, based on the service profile model, the method can comprise obtaining, by the wireless network device, a configuration parameter usable in connection with provisioning the mobile device with an ability to use the resource.

According to another embodiment, a system can facilitate receiving, from a first mobile device, a request for a resource for a second mobile device. In response to the receiving the request for the resource, the system can comprise identifying a service profile model applicable to the request for the resource. In response to the identifying the service profile model, the system can comprise obtaining the service profile model applicable to the resource. Additionally, based on the service profile model, the system can comprise generating a configuration parameter to use to facilitate provisioning the resource for the second mobile device.

According to yet another embodiment, described herein is a machine-readable storage medium that can perform the operations comprising receiving, from a first mobile device, a first request for a resource associated with a wireless network. The machine-readable storage medium can perform the operations comprising receiving, from the first mobile device, a second request for the resource for a second mobile device. In response to the receiving the first request, the machine-readable storage medium can perform the operations comprising requesting a service profile model to be utilized to provision the resource. Additionally, in response to the requesting the service profile model, the machine-readable storage medium can perform the operations comprising receiving the service profile model applicable to the resource. Furthermore, based on the service profile model, the machine-readable storage medium can perform the operations comprising generating a configuration parameter applicable to provisioning the resource.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
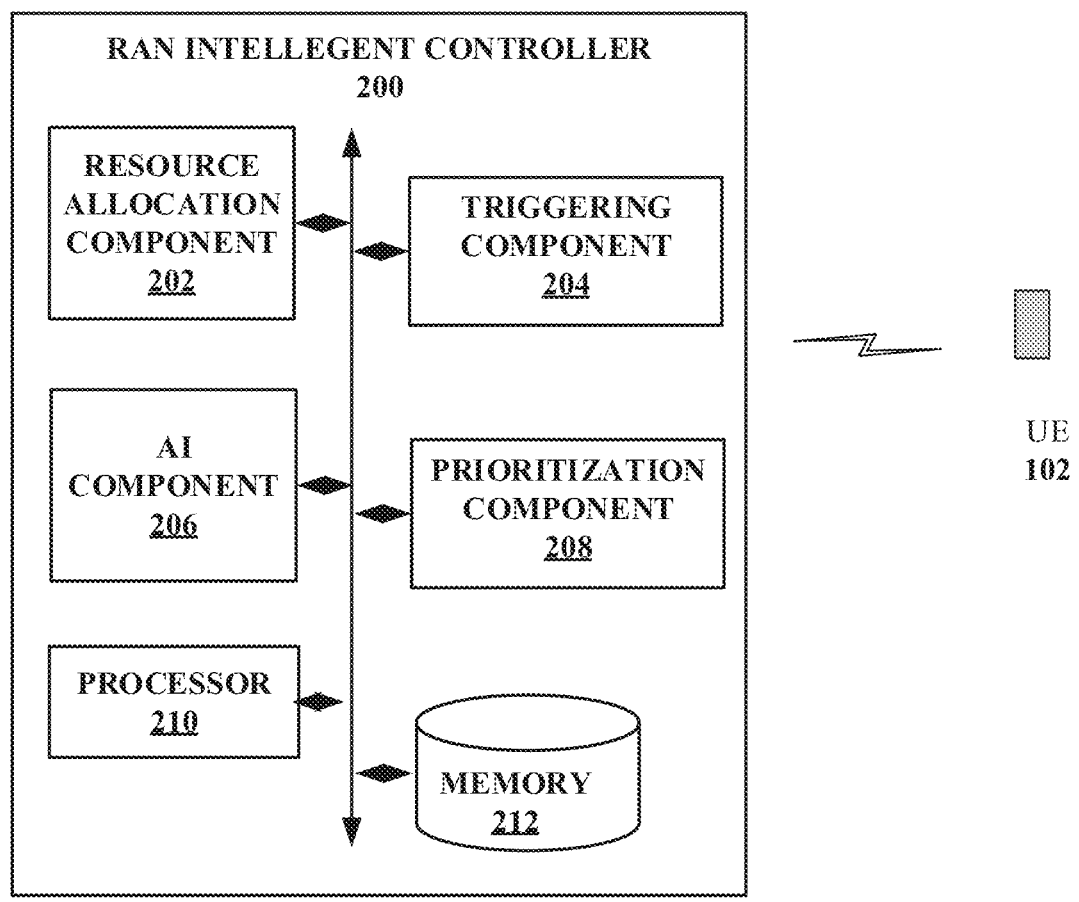
FIG. 2 illustrates an example schematic system block diagram of a radio access network intelligent controller according to one or more embodiments.

Referring now to FIG. 2, illustrated is an example schematic system block diagram of a radio access network intelligent controller according to one or more embodiments. As depicted in FIG. 2, an RIC 200 can comprise sub-components (e.g., resource allocation component 202, triggering component 204, AI component 206, and prioritization component 208), processor 210 and memory 212 can bi-directionally communicate with each other. It should also be noted that in alternative embodiments that other components including, but not limited to the sub-components, processor 210, and/or memory 212, can be external to the RIC 200. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the RIC 200. In an aspect, the RIC 200 can also include memory 212 that stores computer executable components and instructions.

The triggering component 204 can receive data associated with an emergency to trigger the system from the mobile device 102. For example, a call to 911 or an API communication from the mobile device 102 of a first responder can be received by the RIC 200 as depicted in the beam as a service system 300 of FIG. 3. Based on predetermined criteria, if the call or API communication is associated with an emergency situation, then the triggering component 204 can trigger additional operations by the RIC 200. Consequently, the triggering component 204 can initiate resource allocation by the resource allocation component 202. The resource allocation component 202 can pull resources from other mobile devices and/or instantiate new resources in response to a triggering event. Network resources such as bandwidth, network capacity, beam patterns, beam pattern functions, workload assignments, etc., can be divided between mobile devices based on a priority associated with the mobile device 102 in relation to the emergency. For example, if the mobile device 102 is requesting emergency services and a second mobile device is requesting entertainment services, then the mobile device 102 can receive the highest priority via the prioritization component 208 because the mobile device 102 is requesting resources to facilitate mitigation of an emergency situation.

Priority assignments can be based on the type of mobile device, geographic location, mobile device power, time, type of emergency (e.g., a fire versus a car accident, etc.), number of concurrent emergencies, location of one emergency in relation to another emergency, first responders, first responder's responsibilities, etc. Thus, based on the priority assigned to the mobile device 102 by the prioritization component 208, the network resources can be allocated to the mobile device 102, by the resource allocation component 202, accordingly. Additionally, the AI component 206 can learn from previous patterns associated with the mobile device 102, priorities assigned to mobile devices, and/or emergency situations and modify resource allocation based on the aforementioned factors and/or historical patterns analyzed by the AI component 206.

Figure 3:
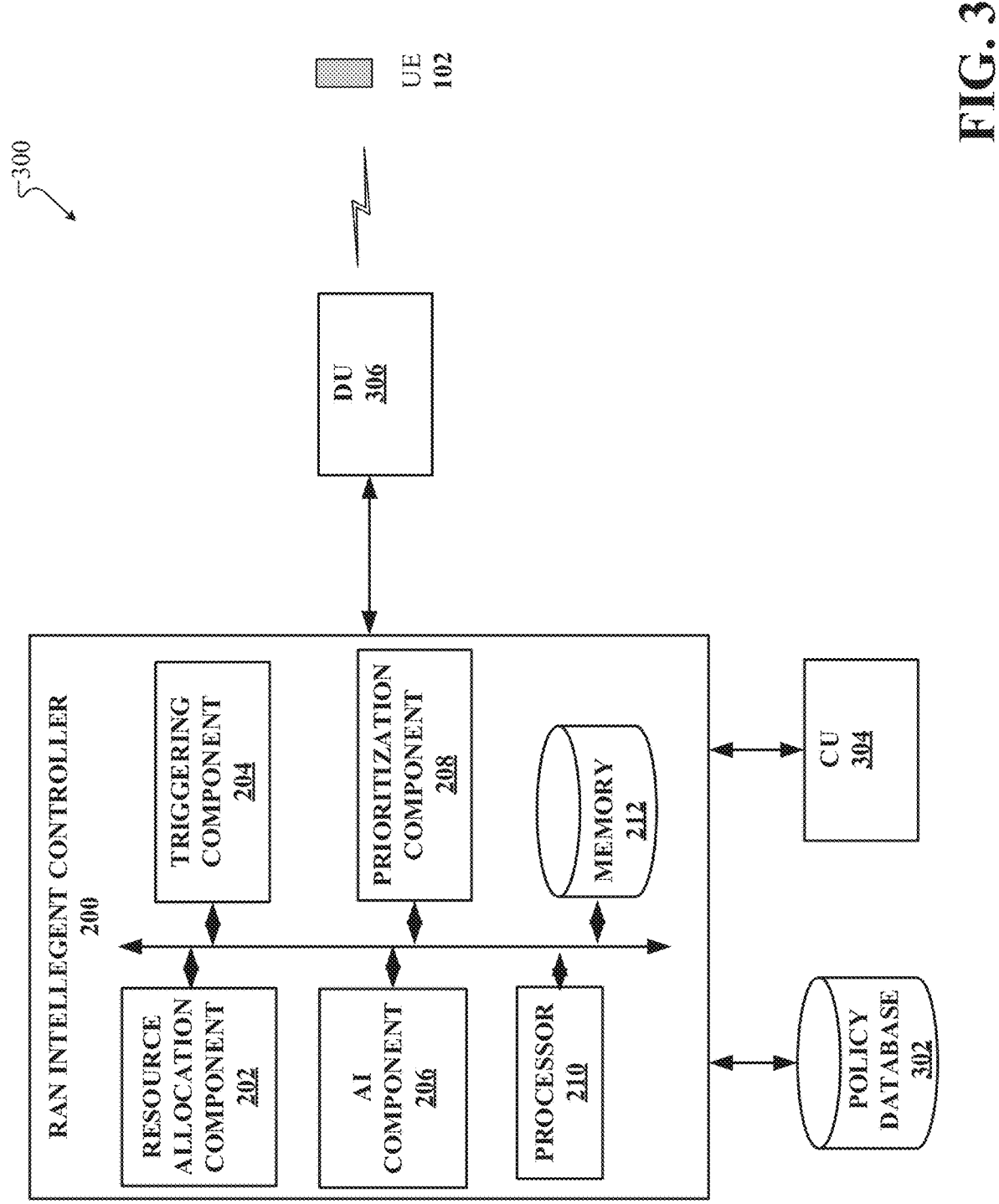
FIG. 3 illustrates an example schematic system block diagram of beam as a service system according to one or more embodiments

Referring now to FIG. 3, illustrated is an example schematic system block diagram of beam as a service system according to one or more embodiments The RIC 200 can communicate with a policy database 302 that is external to the RIC 200, a centralized unit (CU) 304 that is external to the RIC 200, and a distributed unit (306) that is also external to the RIC 200. The policies within the policy database 302 can be adjusted with regards to resources for certain emergencies that can occur. Resources can be radio resources (e.g., bandwidth, handover, compression, etc.) or physical resources. For example, during a police vehicle chase, the police car is moving at a high rate of speed. So to the service system 300 can have a policy that initiates the deployment of the drone camera in order to help keep up with and help capture the suspect during a highspeed chase. The policies can be mapped to emergency situations based on the resources that can be assigned to target the emergency situations. The beam as a service system 300 can provide a priority for emergencies over all other wireless traffic types. For example, with prioritization, entertainment can be the lowest, and business transactions as highest priority below first responders' communications. A database in the RIC 200 can comprise data on first responders, their responsibilities for a given location. Additionally, specific non-essential services in the CU 304 and/or the DU 306 can be shut down as inappropriate if resources are needed for the emergency.

Figure 4:
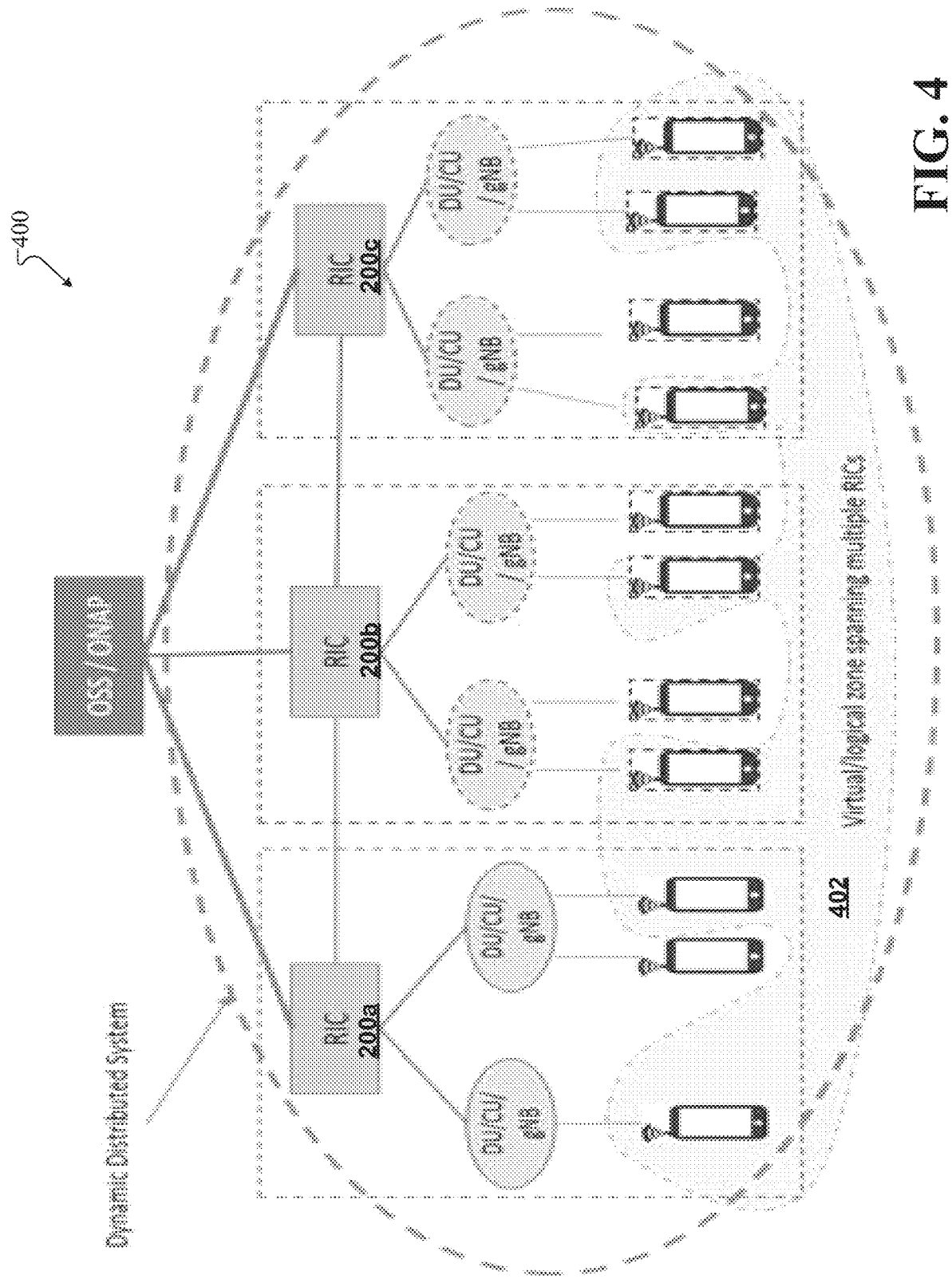
FIG. 4 illustrates an example schematic system block diagram of a dynamic distributed system according to one or more embodiments.

Referring now to FIG. 4, illustrated is an example schematic system block diagram of a dynamic distributed system 400 according to one or more embodiments. Repetitive description of like elements employed in other embodiments described herein is omitted for sake of brevity.

As depicted in FIG. 4, as a UE 102 comes under a coverage area, then the RICs 200a, 200b, 200c can engage with the UE 102 with a beam-like mechanism. The beam can satisfy the requirements of the service that the UE 102 is asking for. For example, if the UE 102 is uploading a video with certain requirements, voice communication, and/or other requirements. However, when the UE 102 enters a specific cell sector (e.g., zone 402), then the beam from an RU in the zone 402 can service the zone based on the associated RIC 200a, 200b, 200c. The UE 102 can be connected the RIC 200a, 200b, 2003 via the DU 306 and/or CU 304, which can be managed by the ONAP. Sometimes when teams of people are working together, there can be a zone 402 for these teams, but others can want to know what is occurring in the zone. Even if they are geographically distance, the others can have similar needs, profiles, etc. to those within the zone. In one scenario, the system can still treat these others as individuals and individually manage them, or the others can be clustered together. For example, if a number of UEs 102 are geographically distributed and have some of the same needs, priority, using similar services, etc., then they can be managed as one entity even though they are distributed. Each UE 102 can be managed by a different RIC 200a, 200b, 200c. Thus, the system can recognize that different UEs 102, although miles apart, can be recognized by a different RIC 200a, 200b, 200c and logically behave as one zone 402 being treated with similar policies, services, etc.

Figure 5:
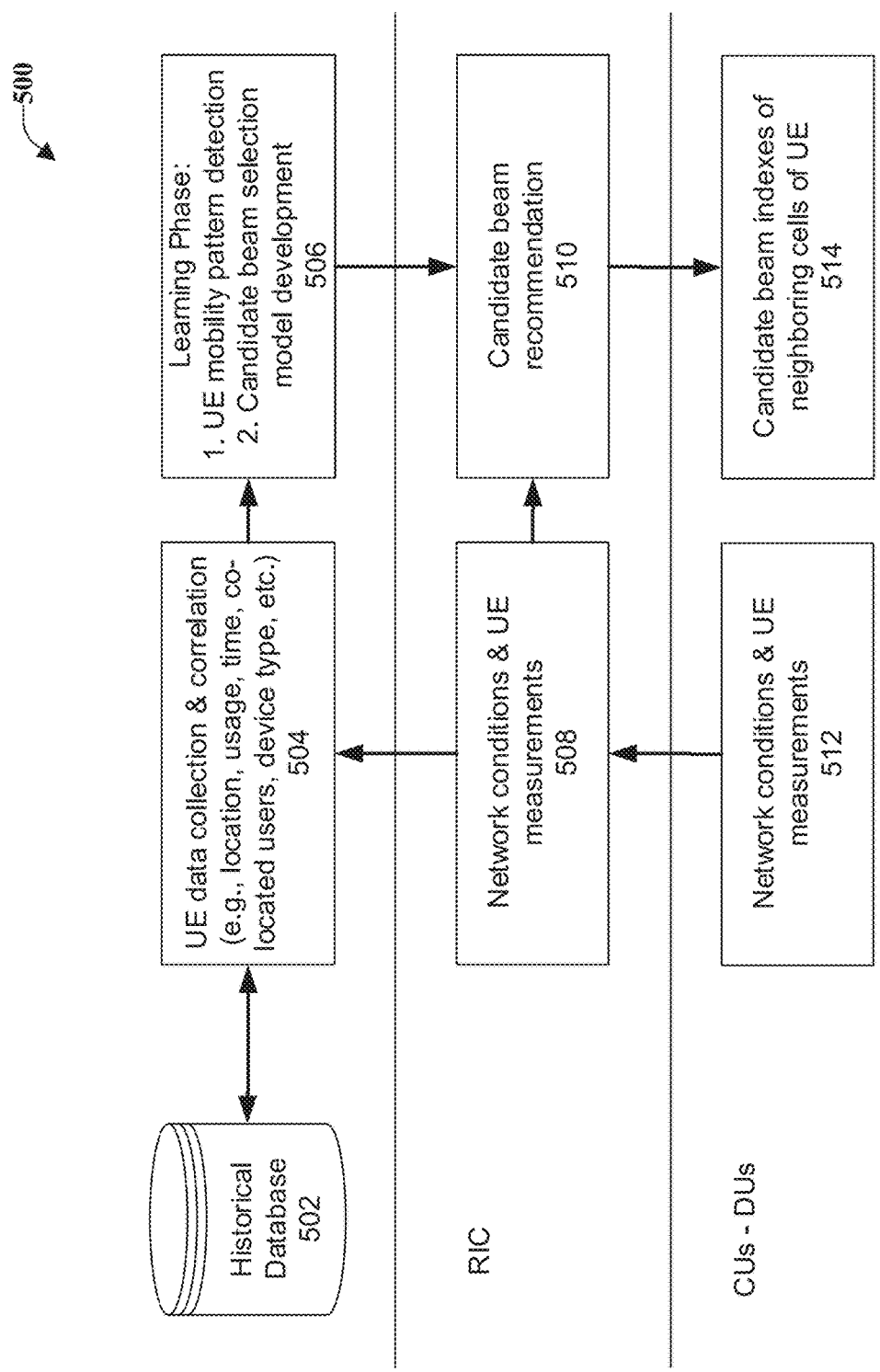
FIG. 5 illustrates an example schematic system block diagram of a closed loop control system according to one or more embodiments.

Referring now to FIG. 5, illustrated is an example flow diagram of a closed loop control system 500. A network management platform database 502 can send and receive data, associated with UEs 102, 104, to block 504 where the UE data can be collected and/or correlated by a collection and correlation component. For example, location data can be correlated to time data associated with a specific UE (e.g., UE 102 is in/near macro-cell 108*f* at 8 am most mornings). The UE data can comprise UE collection data, UE correlation data, UE usage data, UE device type data, etc. The UE data can be sent to the UE data collection and correlation component at block 504 from a network conditions and UE measurement component within the RIC at block 508. Once the UE data collection and correlation component receives the UE data and correlates the UE data, the UE data collection and correlation component can send the UE data and correlation data to a learning component at block 506. The learning component can utilize AI or machine learning (ML) to detect UE mobility patterns and develop a candidate beam selection model that can then be sent to a candidate beam recommendation component of the RIC to facilitate a candidate beam recommendation at block 510.

The network conditions and UE measurement component of centralized units (CUs) and/or distributed units (DUs) at block 512 can send the network condition and measurement data to the network conditions and UE measurement component within the RIC at block 508. The RIC can then use the network measurements to determine which beams will be the candidate beams and then send the candidate beam recommendation to the CUs and/or DUs via the candidate beam recommendation component at block 510. Thereafter, the candidate beams of neighboring cells of the UE can be indexed at block 514, via an indexing component of the CUs and/or DUs. Because this is a closed-loop system, it can be further conditioned and fine-tuned via the learning component the more data is curated. Thus, the service model can ensure that UEs 102 have a similar quality of connectivity for. Thus, the ONAPP can provide the service models to coordinate providing the service instances to the various RICs.

Figure 6:
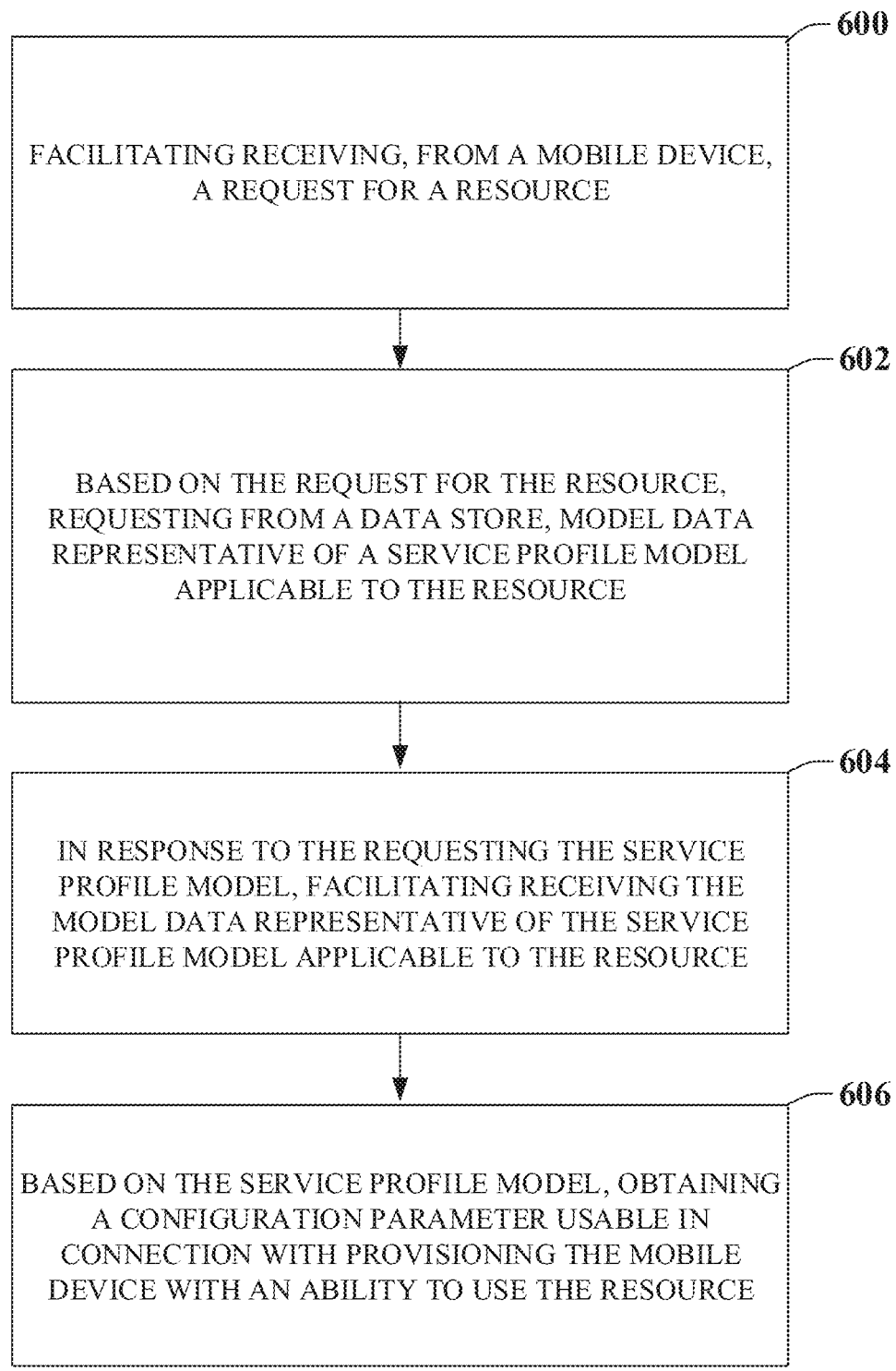
FIG. 6 illustrates an example flow diagram for a method for facilitating predictive and proactive beam management according to one or more embodiments.

Referring now to FIG. 6, illustrated is an example flow diagram for a method for facilitating predictive and proactive beam management according to one or more embodiments.

In one embodiment, described herein is a method comprising facilitating, by a wireless network device comprising a processor, receiving (e.g., RIC 200), from a mobile device (e.g., UE 102), a request for a resource. Based on the request for the resource, the method can comprise requesting, by the wireless network device (e.g., RIC 200) from a data store (e.g., policy database 302), model data representative of a service profile model applicable to the resource. Additionally, in response to the requesting the service profile model, the method can comprise facilitating, by the wireless network device (e.g., RIC 200), receiving the model data representative of the service profile model applicable to the resource. Furthermore, based on the service profile model, the method can comprise obtaining, by the wireless network device (e.g., RIC 200), a configuration parameter usable in connection with provisioning the mobile device (e.g., UE 102) with an ability to use the resource.

Figure 7:
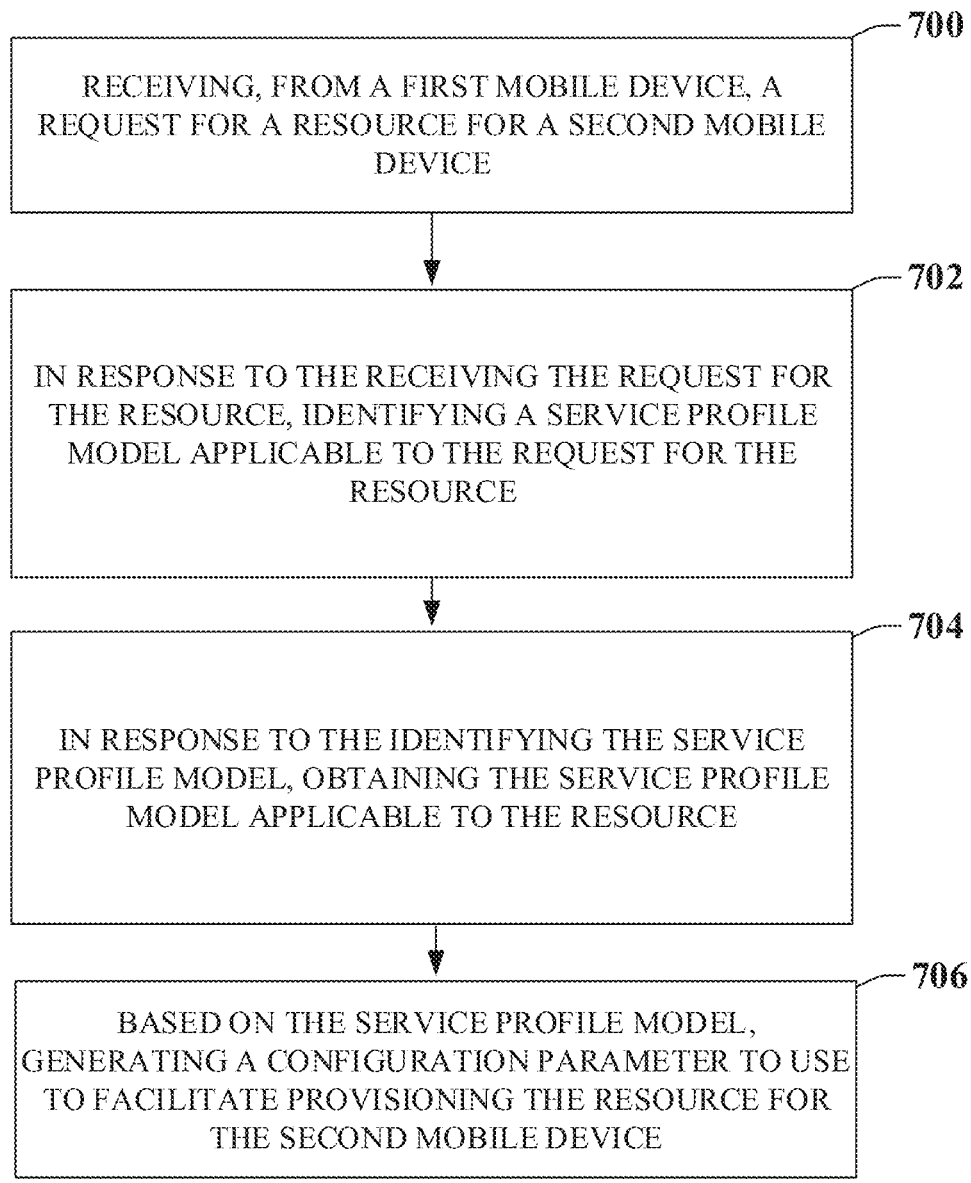
FIG. 7 illustrates an example flow diagram for a system for facilitating predictive and proactive beam management according to one or more embodiments.

Referring now to FIG. 7, illustrated is an example flow diagram for a system for facilitating predictive and proactive beam management according to one or more embodiments.

According to another embodiment, a system can facilitate receiving (e.g., RIC 200), from a first mobile device (e.g., UE 102), a request for a resource for a second mobile device (e.g., UE 106). In response to the receiving (e.g., via the RIC 200) the request for the resource, the system can comprise identifying (e.g., via the RIC 200) a service profile model applicable to the request for the resource. In response to the identifying the service profile model, the system can comprise obtaining (e.g., via the RIC 200) the service profile model applicable to the resource. Additionally, based on the service profile model, the system can comprise generating a configuration parameter (e.g., via the RIC 200) to use to facilitate provisioning the resource for the second mobile device (e.g., UE 106)

Figure 8:
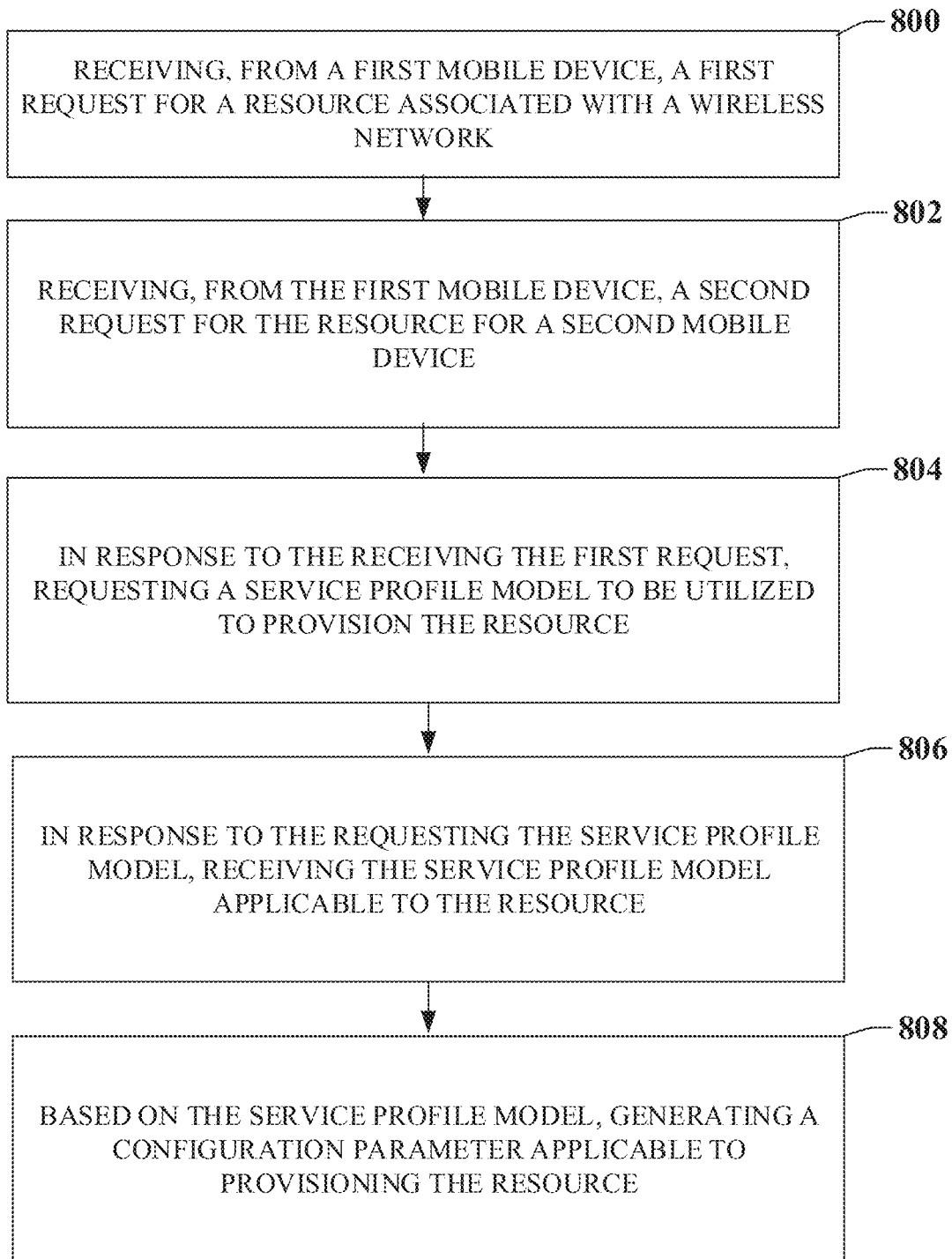
FIG. 8 illustrates an example flow diagram for a machine-readable medium for facilitating predictive and proactive beam management according to one or more embodiments.

Referring now to FIG. 8, illustrated is an example flow diagram for a machine-readable medium for facilitating predictive and proactive beam management according to one or more embodiments.

According to yet another embodiment, described herein is a machine-readable storage medium that can perform the operations comprising receiving (e.g., via the RIC 200), from a first mobile device (e.g., UE 102), a first request for a resource associated with a wireless network. The machine-readable storage medium can perform the operations comprising receiving (e.g., via the RIC 200), from the first mobile device (e.g., UE 102), a second request for the resource for a second mobile device (e.g., UE 106). In response to the receiving the first request, the machine-readable storage medium can perform the operations comprising requesting (e.g., via the RIC 200) a service profile model to be utilized to provision the resource. Additionally, in response to the requesting the service profile model, the machine-readable storage medium can perform the operations comprising receiving (e.g., via the RIC 200) the service profile model applicable to the resource. Furthermore, based on the service profile model, the machine-readable storage medium can perform the operations comprising generating (e.g., via the RIC 200) a configuration parameter applicable to provisioning the resource.

Figure 9:
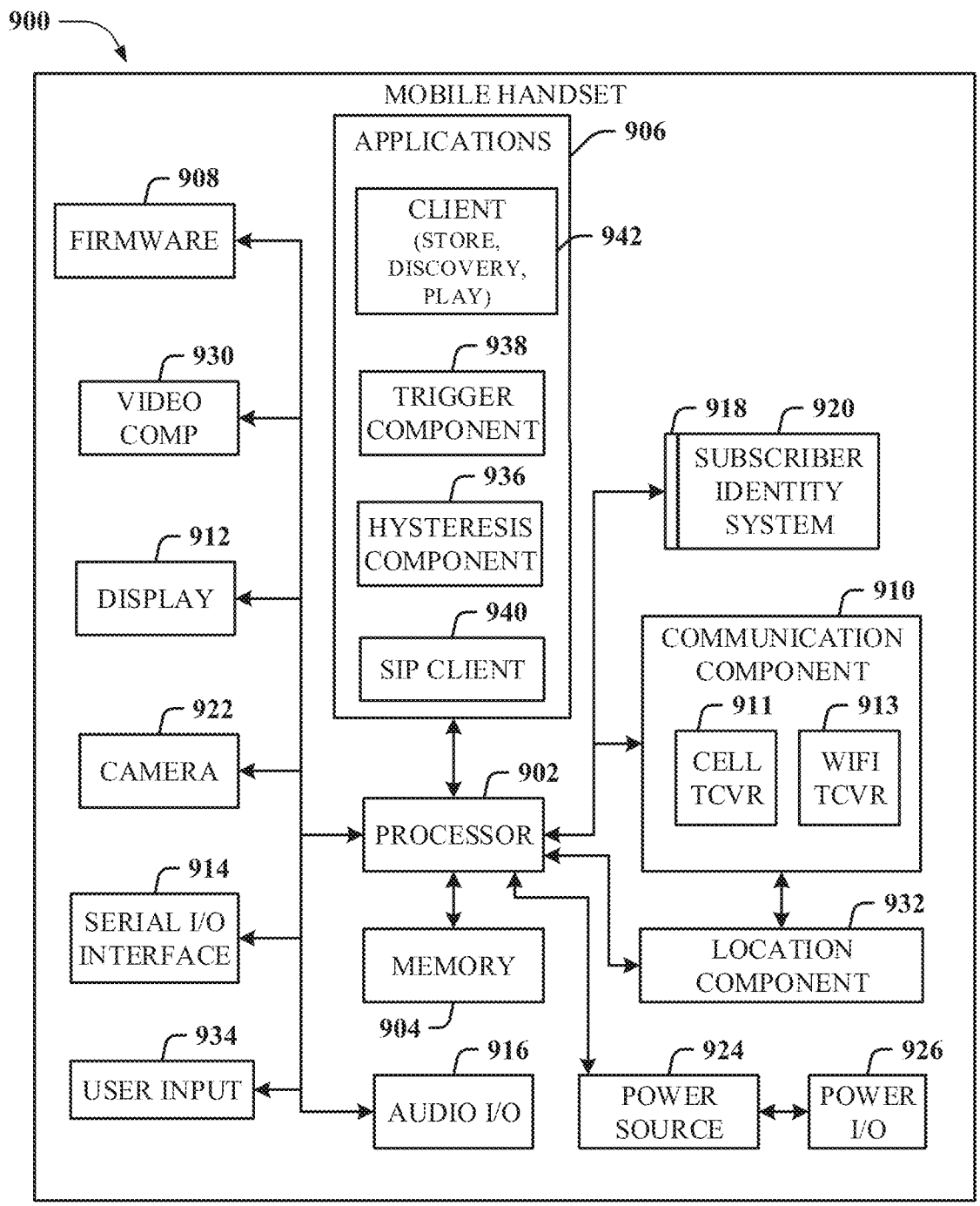
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
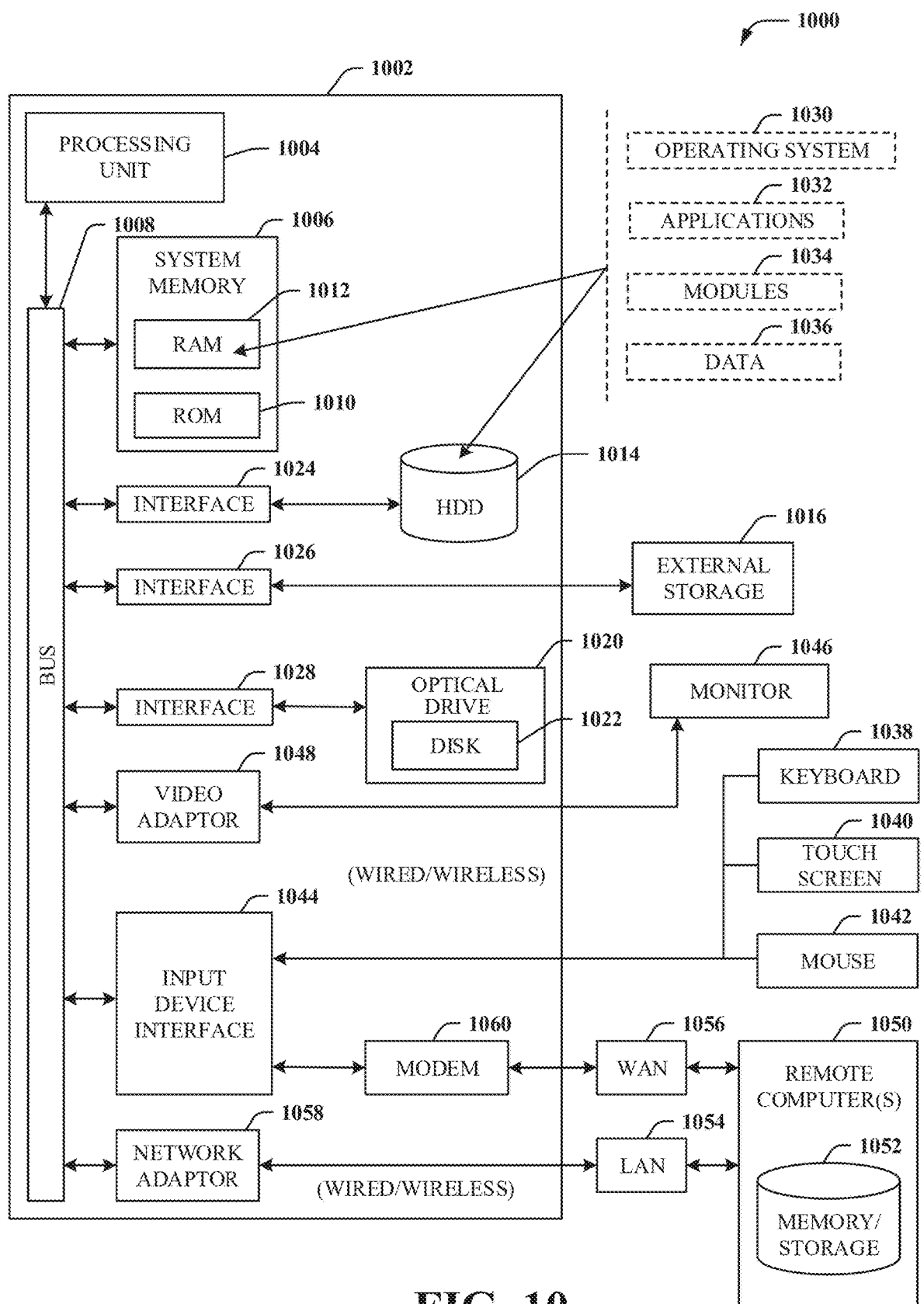
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.xx wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.xx technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by network equipment comprising a processor, receiving, from a first user equipment, a first request for a resource;
   facilitating, by the network equipment, receiving, from a second user equipment, a second request for the resource;
   based on the first request for the resource, requesting, by the network equipment from a data store, model data representative of a service profile model applicable to the resource;
   in response to requesting the service profile model, facilitating, by the network equipment, receiving the model data representative of the service profile model applicable to the resource;
   based on the service profile model, obtaining, by the network equipment, a configuration parameter usable in connection with provisioning the first user equipment with an ability to use the resource;
   in response to receiving the second request for the resource, allocating, by the network equipment, the resource to the second user equipment;
   in response to allocating the resource to the second user equipment, grouping, by the network equipment, the first user equipment and the second user equipment into a group of user equipment; and
   in response to a network condition being determined to have been satisfied, receiving, by the network equipment, a third request from the second user equipment to exit the group.

2. The method of claim 1, further comprising:
   based on the service profile model, generating, by the network equipment, a virtual zone to be associated with the first user equipment.

3. The method of claim 2, further comprising:
   assigning, by the network equipment, a global identification number to the service profile model for use in a distributed computing system.

4. The method of claim 1, further comprising:
   in response to generating the configuration parameter, facilitating, by the network equipment device, sending the configuration parameter to a radio access network device.

5. The method of claim 1, further comprising:
   assigning, by the network equipment, a global identification number to the service profile model.

6. The method of claim 1, wherein the second request for the resource comprises a further request that the second user equipment receive the resource in addition to the first user equipment.

7. The method of claim 1, further comprising:
   in response to generating a beam pattern, dispatching, by the network equipment, pattern data representative of the beam pattern to radio access network equipment.

8. Network equipment, comprising:
   a processor; and
   a memory that stores executable instructions that, when executed by the processor, facilitate performance of operations, comprising:
   receiving, from a first user equipment, a first request for a resource for a second user equipment;
   in response to receiving the request for the resource, identifying a service profile model applicable to the first request for the resource;
   in response to identifying the service profile model, obtaining the service profile model applicable to the resource;
   based on the service profile model, generating a configuration parameter to use to facilitate provisioning the resource for the second user equipment;
   in response to receiving a second request for the resource, allocating the resource to the second user equipment;
   in response to allocating the resource to the second user equipment, grouping the first user equipment and the second user equipment into a group of user equipment; and
   in response to a network condition being determined to have been satisfied, receiving a third request from the second user equipment to exit the group.

9. The network equipment of claim 8, wherein the operations further comprise:
   in response to receiving the second request for the resource for the second user equipment, facilitating a distributed computing control protocol for a radio access network intelligent control device.

10. The network equipment of claim 8, wherein the operations further comprise:
    based on a condition associated with an emergency being determined to have been satisfied, handling a third request for the resource from a third user equipment.

11. The network equipment of claim 10, wherein the operations further comprise:
    in response to receiving the third request for the resource from the third user equipment, identifying a global identification number for use in a distributed computing system.

12. The network equipment of claim 11, wherein the operations further comprise:
    in response to identifying the global identification number, authenticating the third user equipment for the resource.

13. The network equipment of claim 12, wherein the operations further comprise:
    in response to authenticating the third user equipment for the resource, adding the third user equipment to the group of user equipment comprising the first user equipment and the second user equipment.

14. The network equipment of claim 13, wherein the group of user equipment are involved in forming a distributed network associated with an open network automation platform.

15. The network equipment of claim 14, wherein the distributed network coordinates execution of the configuration parameter by the open network automation platform.

16. A non-transitory machine-readable medium, comprising executable instructions that, when executed by a processor, facilitate performance of operations, comprising:
    receiving, from a first mobile device, a first request for a network resource;

receiving, from the first mobile device, a second request for the network resource for a second mobile device;

in response to receiving the first request, requesting a service profile model to be utilized to provision the network resource;

in response to requesting the service profile model, receiving the service profile model applicable to the network resource;

based on the service profile model, generating a configuration parameter applicable to provisioning the network resource;

in response to receiving the second request for the network resource for the second mobile device, allocating the network resource to the second mobile device;

in response to allocating the network resource to the second mobile device, grouping the first mobile device and the second mobile device into a group of mobile devices; and in response to a condition associated with the wireless network being determined to have been satisfied, receiving a third request from the second mobile device to be excluded from the group.

17. The non-transitory machine-readable medium of claim 16, wherein the condition is a first condition, and wherein the operations further comprise:

based on a second condition associated with an emergency being determined to have been satisfied, receiving the third request.

18. The non-transitory machine-readable medium of claim 16, wherein the operations further comprise:

determining a global identification number for use in a distributed computing system.

19. The non-transitory machine-readable medium of claim 16, wherein the group of mobile devices is configured to execute a network configuration policy associated with a wireless network via which the network resource is enabled.

20. The non-transitory machine-readable medium of claim 18, wherein the operations further comprise:

in response to determining the global identification number, authenticating a third mobile device for the network resource.

* * * * *